(12) United States Patent
Markel et al.

(10) Patent No.: US 7,676,475 B2
(45) Date of Patent: Mar. 9, 2010

(54) SYSTEM AND METHOD FOR EFFICIENT META-DATA DRIVEN INSTRUMENTATION

(75) Inventors: Arieh Markel, Broomfield, CO (US); Alexander G. Vul, Palo Alto, CA (US); Brandon Eugene Taylor, Longmont, CO (US); Peter H. Schow, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 833 days.

(21) Appl. No.: 11/472,660

(22) Filed: Jun. 22, 2006

(65) Prior Publication Data
US 2008/0010289 A1    Jan. 10, 2008

(51) Int. Cl.
*G06F 17/30* (2006.01)

(52) U.S. Cl. ............................... 707/10; 707/4

(58) Field of Classification Search ............ None
See application file for complete search history.

(56) References Cited

U.S. PATENT DOCUMENTS

| | | | |
|---|---|---|---|
| 6,167,405 A | | 12/2000 | Rosensteel, Jr. et al. |
| 6,868,453 B1 * | | 3/2005 | Watanabe .................. 709/234 |
| 6,999,956 B2 | | 2/2006 | Mullins |
| 7,237,031 B2 * | | 6/2007 | Cheng ........................ 709/230 |
| 7,290,244 B2 | | 10/2007 | Peck et al. |
| 7,546,335 B2 * | | 6/2009 | Moeller et al. .............. 709/201 |
| 2002/0091702 A1 * | | 7/2002 | Mullins ....................... 707/100 |
| 2003/0023518 A1 | | 1/2003 | Spriggs et al. |
| 2003/0163298 A1 | | 8/2003 | Odom et al. |
| 2003/0187868 A1 * | | 10/2003 | Igarashi ....................... 707/102 |
| 2004/0044793 A1 | | 3/2004 | Pauly et al. |
| 2004/0062267 A1 * | | 4/2004 | Minami et al. .............. 370/463 |
| 2005/0165881 A1 | | 7/2005 | Brooks et al. |
| 2005/0204088 A1 * | | 9/2005 | Ho et al. ..................... 710/308 |
| 2006/0167935 A1 * | | 7/2006 | Atarashi et al. .......... 707/104.1 |
| 2006/0168396 A1 * | | 7/2006 | LaMothe et al. ............ 711/113 |
| 2006/0236225 A1 | | 10/2006 | Achilles et al. |
| 2007/0055643 A1 | | 3/2007 | Iwatsu et al. |
| 2008/0168229 A1 * | | 7/2008 | Beelen et al. ................ 711/118 |

OTHER PUBLICATIONS

"CIM Tutorial"; Distributed Management Task Force, Inc. and WBEM Solutions, Inc.; www.wbemsolutions.com/tuitorials/CIM/; 2003; (105 pages).

* cited by examiner

*Primary Examiner*—Neveen Abel Jalil
*Assistant Examiner*—Bai D. Vu
(74) *Attorney, Agent, or Firm*—Osha • Liang LLP (57) ABSTRACT

A method for gathering management information about an asset that includes receiving a first request for the management information about the asset, wherein the first request complies with the information model format, identifying a data acquisition (DAQ) definition for the DAQ definition complies with the DAQ format, triggering a protocol handler according to the DAQ definition, receiving the management information from the protocol handler about the asset, and updating a cache entry with the management information.

20 Claims, 7 Drawing Sheets

SYSTEM AND METHOD FOR EFFICIENT META-DATA DRIVEN INSTRUMENTATION

CROSS-REFERENCE TO RELATED APPLICATIONS

The present application contains subject matter that may be related to the subject matter in the following U.S. patent applications, which are all assigned to a common assignee: "System and Method for Meta-data Driven Instrumentation" application Ser. No. 11/472,660 filed on Jun. 22, 2006; "System and Method for Meta-data Driven Instrumentation" application Ser. No. 11/472,660 filed on Jun. 22, 2006; "Resource Discovery and Enumeration in the Meta-Data Driven Instrumentation" application Ser. No. 11/473,098 filed on Jun. 22, 2006; "System and Method for Object-Oriented Meta-Data Driven instrumentation" application Ser. No. 11/473,099 filed on Jun. 22, 2006; "System and Method for Native-Asset-Interface Libraries for Instrumentation" application Ser. No. 11/472,852 filed on Jun. 22, 2006; "Asynchronous Events in Meta-Data Driven Instrumentation" application Ser. No. 11/473,100 filed on Jun. 22, 2006; and "System and Method for Mapping between Instrumentation and Information Model" application Ser. No. 11/473,197 filed on Jun. 22, 2006.

BACKGROUND

A network corresponds to an interconnection of more than one computer system. For example, one type of network is a home network. A home network may correspond to two or more personal computers that can exchange data with each other and the Internet. Different types of networks exist throughout society. For example, large organizations often have data centers, servers, and various personal computer systems to exchange information between users, and to provide processing power to a single user.

In order to provide such functionality, a network includes various types of hardware and software. For example, the hardware includes the computer systems (personal computers, servers, and other such computing devices), network interface hardware, interconnection mediums (e.g., cables, wireless signals, etc.) routers, switches, hubs, and other such hardware. The software is instructions for providing the functionality of the network. For example, the software may include operating systems, network specific applications, user applications, server applications, etc.

In order to keep a network operating properly, the network must be managed. Managing a network involves managing the different resources (i.e., hardware and software) of the network. Typically, a resource can be managed through an application programming interface (API) of the resource. An application programming interface is the interface that a resource provides in order to allow management requests for service and management data to be made of the resource by management applications. Specifically, a management application that has knowledge of the application programming interface of the resource can manage the resource by accessing the different functions and data available through the application programming interface of the resource.

SUMMARY

In general, in one aspect, the invention relates to a method for gathering management information about an asset that includes receiving a first request for the management information about the asset, wherein the first request complies with the information model format, identifying a data acquisition (DAQ) definition for the DAQ definition complies with the DAQ format, triggering a protocol handler according to the DAQ definition, receiving the management information from the protocol handler about the asset, and updating a cache entry with the management information.

In general, in one aspect, the invention relates to a system for gathering management information about an asset that includes a DAQ definition, a DAQ manager configured to receive a first request for the management information, wherein the first request complies with the information model format, identify the DAQ definition for the first request, trigger a protocol handler according to the DAQ definition, receive the management information from the protocol handler about the asset, and update a cache entry with the management information, and an information model runtime configured to translate the first request from an information model format to a DAQ format, wherein the DAQ definition complies with the DAQ format.

In general, in one aspect, the invention relates to a distributed computer system having a plurality of nodes for performing a method that includes receiving a first request for the management information about an asset, wherein the first request complies with the information model format, identifying a DAQ definition for the first request, translating the first request from an information model format to a DAQ format, wherein the DAQ definition complies with the DAQ format, triggering a protocol handler according to the DAQ definition, receiving the management information from the protocol handler about the asset, and updating a cache entry with the management information, wherein the protocol handler is performed on at least one of the plurality of nodes.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention.

However, it will be apparent to one of ordinary skill in the art that the invention may be practiced without these specific details. In other instances, well-known features have not been described in detail to avoid unnecessarily complicating the description.

In general, embodiments of the invention provide a method and apparatus for managing assets. Specifically, embodiments of the invention provide a mechanism for managing assets of different asset types through a common interface. Managing an asset includes monitoring the asset, actively managing the asset, registering the asset, or performing any other function on the asset. More specifically, embodiments of the invention abstract the application programming interface from the management data and functionality associated with a single asset. Using the abstraction, a management application and information model can manage an asset without knowing the application programming interface of the asset. Furthermore, embodiments of the invention store the management information that is received from the asset for future reference. Specifically, embodiments of the invention provide a mechanism whereby a developer can control which management information is stored at virtually any granularity.

Figure 1:
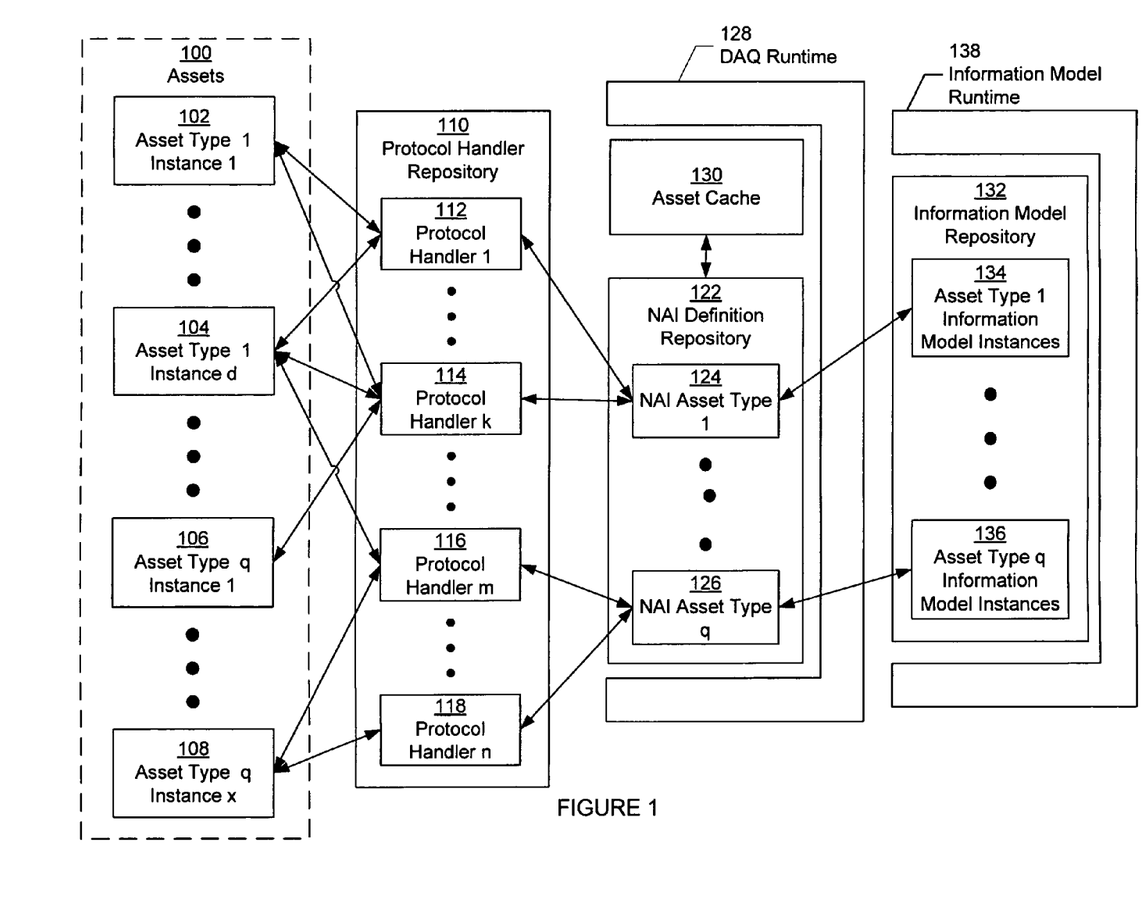
FIG. 1 shows a schematic diagram of a system for managing assets in accordance with one or more embodiments of the invention.

FIG. 1 shows a schematic diagram of a system for managing assets in accordance with one or more embodiments of the invention. As shown in FIG. 1, the system includes assets (100), a protocol handler repository (110), a native asset interface (NAI) definition repository (122), an asset cache (130), a data acquisition (DAQ) runtime (128), an information model repository (132), and an information model runtime (138) in accordance with one or more embodiments of the invention. Each of these components is described below.

An asset (100) corresponds to any type of actual manageable resource in accordance with one or more embodiments of the invention. Specifically, asset (100) corresponds to the resources that are the object of the management. For example, an asset may correspond to software (e.g., operating system, database application, network application, or any other type of software) or hardware (e.g., computer systems, routers, switches, etc.).

One attribute of an asset (100) corresponds to the asset type. An asset type specifies a group of characteristics of the asset. The asset type may specify a type of operating system, a type of hardware, a type of server, etc. For example, if the asset is an operating system, then the asset type for the asset may correspond to a particular operating system, such as Solaris™ developed by Sun Microsystems, Inc. (a trademark of Sun Microsystems, Inc. located in Santa Clara). In one or more embodiments of the invention, assets that have the attribute of the same asset type have the same native asset interface (NAI) for managing the resources of the asset.

An NAI corresponds to a collection of instrumentation and control interfaces that is provided by the asset for the purposes of managing the asset. For example, an NAI may correspond to command line programs, files, simple network management protocol (SNMP), Intelligent Platform Management Interface (IPMI), etc.

An asset type may have one or more instances (e.g., asset type 1/instance 1 (102), asset type 1/instance d (104), asset type q/instance 1 (106), asset type q/instance x (108)) of the asset type. In particular, assets that are of the same asset type are called instances of the asset type. For example, as shown in FIG. 1, asset type 1 has at least two instances (e.g., asset type 1/instance 1 (102) and asset type 1/instance d (104)), while asset type q has at least two separate instances (e.g., asset type q/instance 1 (106) and asset type q/instance x (108)).

Continuing with FIG. 1, the system also includes a protocol handler repository (110) in accordance with one or more embodiments of the invention. A protocol hander repository (110) corresponds to a storage unit, such as a file system or library, for protocol handlers (e.g., protocol handler 1 (112), protocol handler k (114), protocol handler m (116), protocol handler n (118)). A protocol handler (e.g., protocol handler 1 (112), protocol handler k (114), protocol handler m (116), protocol handler n (118)) corresponds to a logical component that includes functionality to directly access the data, methods, and functions of an asset (100). Specifically, the protocol handler (e.g., protocol handler 1 (112), protocol handler k (114), protocol handler m (116), protocol handler n (118) includes functionality to use the NAI of the asset in order to manage the asset.

In one or more embodiments of the invention, each protocol handler (e.g., protocol handler 1 (112), protocol handler k (114), protocol handler m (116), protocol handler n (118)) is designed for a single protocol or NAI. For example, one protocol handler (e.g., protocol handler 1 (112), protocol handler k (114), protocol handler m (116), protocol handler n (118)) may include functionality to manage assets that use the SNMP, another protocol handler may be designed for IPMI, while another protocol handler may be designed for assets that are managed through Integrated Light Out Management (ILOM) developed by Sun Microsystems, Inc., and another protocol handler may manage assets that use the Network Time Protocol (NTP). In one or more embodiments of the invention, only one protocol handler exists for any single protocol. Those skilled in the art will appreciate that multiple protocol handlers may exist for any single protocol for redundancy purposes.

Because the protocol handlers are associated with a single protocol, each protocol handler (e.g., protocol handler 1 (112), protocol handler k (114), protocol handler m (116), protocol handler n (118)) is connected to one or more asset instance (e.g., asset type 1/instance 1 (102), asset type 1/instance d (104), asset type q/instance 1 (106), asset type q/instance x (108)) in accordance with one or more embodiments of the invention. Specifically, assets (100) that have at least one common NAI are connected to the same protocol handler regardless of whether the assets are of the same asset type.

Similarly, each asset instance (e.g., asset type 1/instance 1 (102), asset type 1/instance d (104), asset type q/instance 1 (106), asset type q/instance x (108)) is connected to one or more protocol handlers (e.g., protocol handler 1 (112), protocol handler k (114), protocol handler m (116), protocol handler n (118)) in accordance with one or more embodiments of the invention. Specifically, each asset instance (e.g., asset type 1/instance 1 (102), asset type 1/instance d (104), asset type q/instance 1 (106), asset type q/instance x (108)) may be accessed by one or more protocol handlers (e.g., protocol handler 1 (112), protocol handler k (114), protocol handler m (116), protocol handler n (118)) that correspond to the protocols for managing the asset.

In addition to the protocol handler repository (110), the system includes a NAI definition repository (122). A NAI definition repository (122) corresponds to a storage unit, such as a library or file system, for NAI definitions (e.g., NAI definition asset type 1 (124), NAI asset type q (126)). An NAI definition (e.g., NAI definition asset type 1 (124), NAI asset type q (126)) corresponds to an abstraction of the management components of an asset in accordance with one or more embodiments of the invention. Specifically, an NAI definition stipulates how data acquisition is performed and how data is populated for access. Moreover, an NAI definition (e.g., NAI definition asset type 1 (124), NAI asset type q (126)) provides a common interface for defining the manageable components of the different assets. In one or more embodiments of the invention, each asset type has a single NAI definition (e.g., NAI definition asset type 1 (124), NAI asset type q (126)). Accordingly, the same NAI asset type definition may be used for multiple asset instances of the same asset type.

In one or more embodiments of the invention, an asset cache (130) is connected to the NAI definition repository (122). An asset cache (130) corresponds to a storage unit (e.g., database, file system, etc.) for management information in accordance with one or more embodiments of the invention. Specifically, the asset cache (130) maintains management information that is received from the assets (100). Further, in one or more embodiments of the invention, the asset cache (130) is configurable. Specifically, policies for storing the management information may be set at virtually any granularity. For example, a developer may specify one policy that the management information for certain asset types should not be stored in the cache, while another policy is that management information for the properties of certain asset instances is stored in the asset cache (130) for a specific duration.

A data acquisition (DAQ) runtime (128) corresponds to a logical component that includes functionality to use a runtime binding of the NAI definition to manage the asset. Moreover, in one or more embodiments of the invention, the DAQ runtime (128) corresponds to the main focus of the system. Specifically, the DAQ runtime includes functionality to operate on NAI definitions (e.g., NAI definition asset type 1 (124), NAI asset type q (126)). The DAQ runtime (128), and the NAI definitions (e.g., NAI definition asset type 1 (124), NAI asset type q (126)) are described in more detail in FIG. 3.

Returning to the NAI repository (122), the NAI definitions (e.g., NAI definition asset type 1 (124), NAI asset type q (126)) are connected to an information model that includes the information model repository (132) and the information model runtime (138). An information model corresponds to a public interface for assets (100). The information model repository (132) corresponds to a storage unit for information model instances (e.g., asset type 1 information model instances (134), asset type q information model instances (136)). The information model instances (e.g., asset type 1 information model instances (134), asset type q information model instances (136)) are described in more detail in FIG. 2.

Continuing with the information model repository (132) of FIG. 1, the information model runtime (138) includes functionality to provide an execution environment for the information model repository (132). Specifically, the information model runtime (138) corresponds to the classes and methods of the information model during execution.

Figure 2:
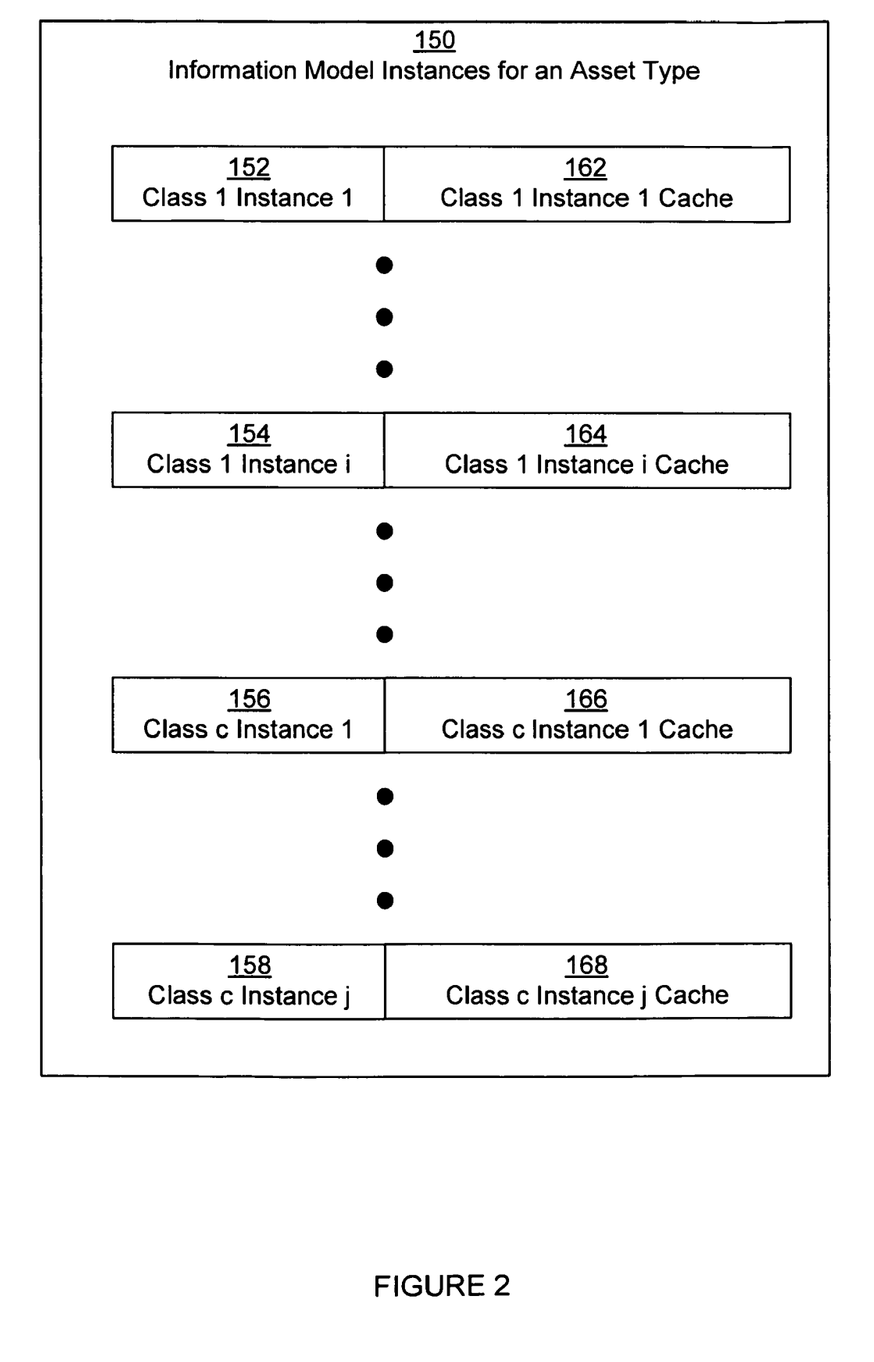
FIG. 2 shows a schematic diagram of information model instances for an asset type in accordance with one or more embodiments of the invention.

FIG. 2 shows a schematic diagram of information model instances for an asset type (150) in accordance with one or more embodiments of the invention. As shown in FIG. 2, each information model for an asset type includes multiple classes. A class corresponds to a collection of methods and properties that are common to a particular kind of component of the asset type. The method corresponds to the methods that can be used for managing an asset. The properties correspond to the manageable variables of an asset. Different classes correspond to different manageable components in accordance with one or more embodiments of the invention. For example, if the asset type is a particular type of server, a class may correspond to properties and methods for managing the operating system component for the particular type of server.

Each class includes multiple class instances (e.g., class 1/instance 1 (152), class 1/instance i (154), class c/instance 1 (158), class c/instance j (156)) in accordance with one or more embodiments of the invention. A class instance (e.g., class 1/instance 1 (152), class 1/instance i (154), class c/instance 1 (156), class c/instance j (158)) corresponds to an abstraction of an asset type instance in information model format. In one or more embodiments of the invention, the information model format corresponds to common information model (CIM) format (developed by Distributed Management Task Force, Inc. located in Portland, Oreg.) As shown in FIG. 2, the class instances (e.g., class 1/instance 1 (152), class 1/instance i (154), class c/instance 1 (156), class c/instance j (158)) for the information model may not be in a one to one relationship with the instances of the asset type for the class. In particular, some asset type instances may not have a corresponding instance for a particular information model class.

Each information model class instance (e.g., class 1/instance 1 (152), class 1/instance i (154), class c/instance 1 (156), class c/instance j (158)), is connected to a cache (e.g., class 1/instance 1 cache (162), class 1/instance i cache (164), class c/instance 1 cache (166), class c/instance j cache (168)) in accordance with one or more embodiments of the invention. A cache (e.g., class 1/instance 1 cache (162), class 1/instance i cache (164), class c/instance 1 cache (166), class c/instance j cache (168)) corresponds to a storage unit for maintaining management information that is received from the DAQ. In one or more embodiments of the invention, only the management information that is received by a particular information model class instance is stored in the cache associated with the information model class instance. Accordingly, the cache associated with an information model class instance only maintains the management information for a particular manageable component of an asset instance in accordance with one or more embodiments of the invention.

Those skilled in the art will appreciate that while FIG. 2 shows a separate cache (e.g., class 1/instance 1 cache (162), class 1/instance i cache (164), class c/instance 1 cache (166), class c/instance j cache (168)) for each information model class instance (e.g., class 1/instance 1 (152), class I/instance i (154), class c/instance 1 (156), class c/instance j (158)), a single cache may be used for multiple information model class instances (e.g., class 1/instance 1 (152), class 1/instance i (154), class c/instance 1 (156), class c/instance j (158)).

In addition to the cache (e.g., class 1/instance 1 cache (162), class 1/instance i cache (164), class c/instance 1 cache (166), class c/instance j cache (168)), each information model class instance (e.g., class 1/instance 1 (152), class 1/instance i (154), class c/instance 1 (156), class c/instance j (158)) is connected to a mapping specification (not shown) in accordance with one or more embodiments of the invention. The mapping specification includes functionality to map between the information model format and the DAQ format of the DAQ runtime. Accordingly, an information model class instance (e.g., class 1/instance 1 (152), class 1/instance i (154), class c/instance 1 (156), class c/instance j (158)) can manage virtually any asset without knowledge of the specific protocols used to manage the asset.

Alternatively, in one or more embodiments of the invention, each information model class instance (e.g., class 1/instance 1 (152), class 1/instance i (154), class c/instance 1 (156), class c/instance j (156)) may include the information required to format communication in the DAQ format in order to directly communicate with the DAQ runtime in accordance with one or more embodiments of the invention.

Figure 3:
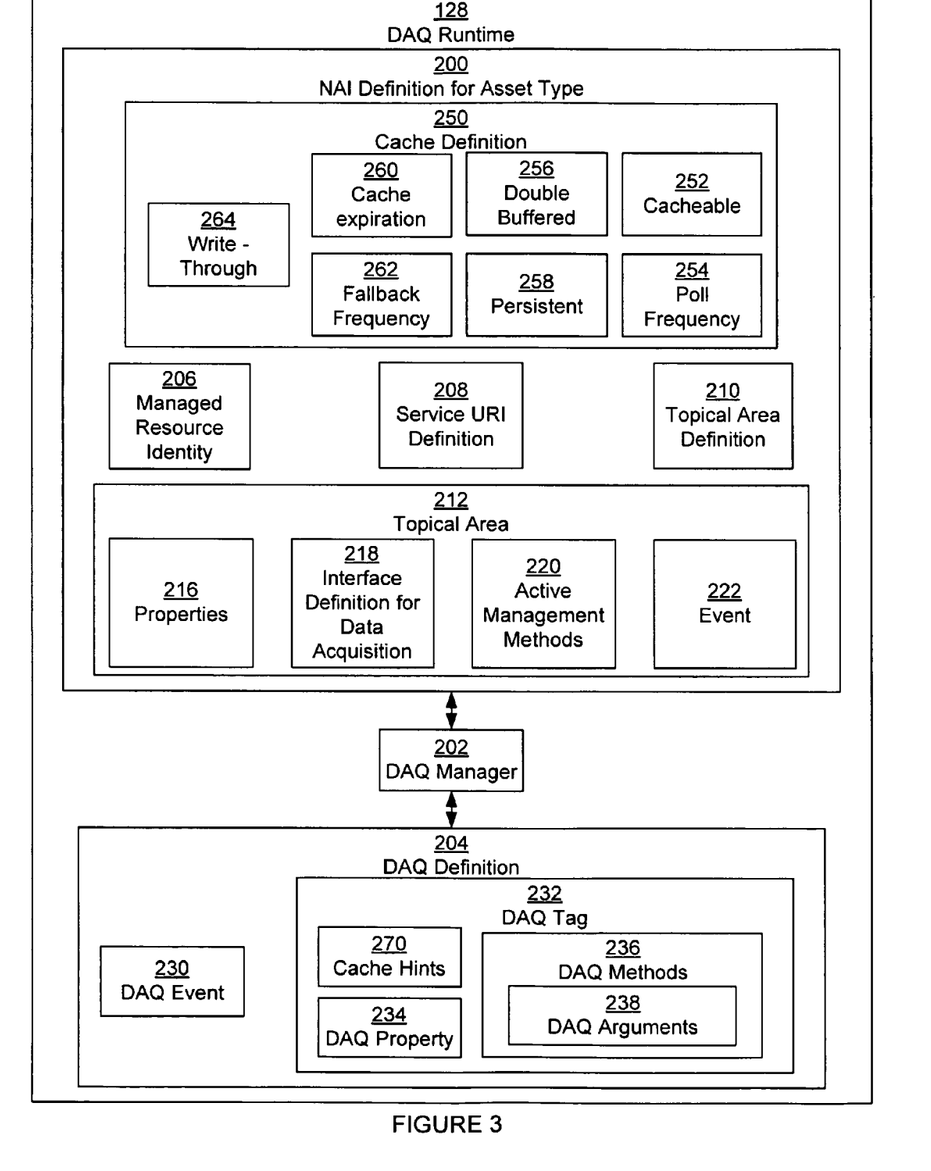
FIG. 3 shows a schematic diagram of a data acquisition runtime used for managing assets in accordance with one or more embodiments of the invention.

FIG. 3 shows a schematic diagram of a DAQ runtime (128) used for managing assets in accordance with one or more embodiments of the invention. As shown in FIG. 3, the DAQ runtime (128) includes an NAI definition for the asset type (200), a DAQ manager (202) and a DAQ definition (204) in accordance with one or more embodiments of the invention. Each of these components is described below.

An NAI definition for an asset type (200) corresponds to a description of the NAI for the asset. Specifically, for each manageable component of the asset type, the NAI definition defines how to manage the component using the NAI of the component. In one or more embodiments of the invention, the NAI definition includes a scheme or protocol (e.g., SNMP, IPMI, etc.), and a part that defines how to execute the NAI in context of the protocol. For example, suppose that information about a computer system are gathered by a command line command "uname-a." Then the NAI definition may specify that the protocol is a shell, the location of the computer system, and the command "uname-a."

In one or more embodiments of the invention, the NAI definition for the asset type (200) defined using extensible markup language (XML). Specifically, the aforementioned components of the NAI definition are denoted by XML tags. Moreover, in one or more embodiments of the invention, the NAI definition complies with a predefined XML schema. The NAI definition for the asset type (200) includes a managed resource identity (206), a service URI definition (208), a topical area definition (210), a topical area (212), and a cache definition (250). Each of these components is described below.

The managed resource identity (206) corresponds to a definition of the asset type. Specifically, the managed resource identity (206) uniquely identifies the asset type in the NAI repository (not shown). In one or more embodiments of the invention, the managed resource identity (206) corresponds to an alpha-numeric identifier.

In addition to the managed resource identity (206), the NAI definition for the asset type (200) includes a service URI definition (208). The service URI definition (208) denotes how instances of the asset are enumerated. Specifically, the service URI definition (208) defines the scheme and method for identifying all instances of the asset type. For example, the service URI definition (208) may specify an enumeration service, a database, a discovery protocol, or any other mechanism for enumerating instances of an asset type.

The NAI definition for the asset type (200) also includes a topical area definition (210) in accordance with one or more embodiments of the invention. A topical area definition (210) identifies the different topical areas that can be managed for an asset type. For example, if the asset type is a computer system, then the topical area definition (210) may specify that the different manageable components of the asset type or topical areas of the asset type. For example, the topical areas may correspond to operating system, storage, networking, executing processes, or other such area.

In accordance with one or more embodiments of the invention, each topical area includes a topical area definition (212). The topical area definition (212) corresponds to a specification for managing the topical area. The topical area definition (212) includes properties (216), interface definitions for data acquisition (218), active management methods (220), and events (222). Each of these components is described below.

Properties (216) correspond to the information in the topical area about the asset type. Specifically, a property (216) corresponds to the information and data that can be set and obtained from an asset. For example, if the topical area corresponds to storage, then the properties may correspond to storage space, partitioning, amount of used space, etc. In one or more embodiments of the invention, the name of a property is unique within the namespace of the topical area. Further, in one or more embodiments of the invention, each property (216) includes a plurality of attributes. For example, the attributes of the property (216) may correspond to the name, a description, whether the property is able to be changed, the data type of values of the property, etc.

The interface definition for data acquisition (218) identifies how the properties (216) are populated in accordance with one or more embodiments of the invention. Specifically, the interface definition for data acquisition (218) specifies the scheme and method in the context of the scheme that is used to manage the asset in relation to the property. For example, the interface definition for data acquisition may correspond to snmp://target@host:port/1.3.6.2.1.1.1.*. The SNMP portion shows the scheme that is used to obtain a property as required by the NAI for the property is SNMP. The remainder portion of the example interface definition corresponds to the location for obtaining and setting the property on the asset.

Continuing with FIG. 3, the topical area definition (212) also includes active management methods (220). The active management methods (220) correspond to information about the methods that the NAI for the asset type provides in order to manage the asset by modification. For example, a method from the NAI may correspond to reset a particular value. The active management methods (220) identify how the value is reset. In one or more embodiment of the invention, active management methods (220) provide information for invoking the method for the NAI of the asset type.

Another component of the topical area definition (212) is an event (222). An event (222) corresponds to information for subscribing for notifications. Specifically, the NAI for the asset type generally includes mechanisms for receiving periodic notifications or only notification of changes. An event (222) corresponds to the definition of how to turn on the NAI for the notifications. For example, an event (222) may correspond to information about how to register for information about temperature.

In accordance with one or more embodiments of the invention, the NAI definition for the asset type (200) also includes a cache definition (250). A cache definition specifies policies for how different components of an asset type are stored in the asset cache. Accordingly, in one or more embodiments of the invention, the cache definition (250) includes a cacheable policy (252), a poll frequency policy (254), a double buffered policy (256), a persistent policy (258), a cache expiration policy (260), a fallback frequency policy (262), and a write-through policy (264). Each of these components is described below.

A cacheable policy (252) defines whether the asset(s) corresponding to the cache definition can be cached. In one or more embodiments of the invention, the cacheable policy corresponds to a Boolean variable, such as true or false.

A poll frequency policy (254) defines how often the cache should obtain data from the asset(s) corresponding to the cache definition in accordance with one or more embodiments of the invention. Specifically, if the management information is to be periodically requested (i.e., polled), then the poll frequency (254) specifies how often the request occurs. Those skilled in the art will appreciate that rather than polling the asset, the asset can periodically send management information to the cache. In such scenario, the poll frequency (254) may specify how often the cache expects to receive management information from the asset.

A double-buffered policy (256) defines whether outdated management information is maintained for the asset(s) corresponding to the cache definition in accordance with one or more embodiments of the invention. Specifically, if the cache is double-buffered, then multiple historical versions, (e.g., a previous version and a current version) of the same management data may exist. While double-buffering requires extra storage, double-buffering allows for a management application to obtain a historical perspective of the management data.

A persistent policy (258) specifies whether the management information for the asset(s) corresponding to the cache definition is maintained in the event of an interruption in accordance with one or more embodiments of the invention. Specifically, a persistent policy specifies the type of storage of the asset cache. For example, in one or more embodiments of the invention, if the storage is not persistent, then the cache is erased in the event of a power failure.

A cache expiration policy (260) specifies a unit of measurement (e.g., time, number of requests, etc.) before the management information in the cache becomes invalid in accordance with one or more embodiments of the invention. Specifically, the cache expiration policy (260) identifies the unit of measurement by which any received management request for the asset must go to the asset.

A fallback frequency policy (262) defines whether to force an out of sequence poll. Specifically, even when polling is used, the cache may also submit requests for management information out of sequence. In one or more embodiments of the invention, the fallback frequency policy (262) specifies a unit of measurement, such as time, that elapses without receiving management information from the asset. Accordingly, the fallback frequency (262) defines that at the end of the unit of measurement, the management information is requested from the asset.

A write-through policy (264) specifies whether the management information should be read from the asset cache or directly from the device in accordance with one or more embodiments of the invention.

Those skilled in the art will appreciate that while FIG. 3 shows specific policies, other policies not shown may also be included in the cache definition (250). For example, a policy may specify a location where a particular piece of management information is to be stored in the cache.

Further, those skilled in the art will appreciate that while FIG. 3 shows the cache definition (250) as a component of the NAI definition for the asset type, the cache definition (250) may be a component of the topical area (212) and/or of the DAQ runtime (128) depending on the level of granularity that is required.

In addition to the NAI definition for the asset type (200), the DAQ runtime (128) includes a DAQ definition (204) in accordance with one or more embodiments of the invention. A DAQ definition (204) corresponds to a runtime image of the NAI definition for the asset type (200). Specifically, the DAQ definition (204) corresponds to a runtime binding of the NAI definition for the asset type (200). For example, whereas in one or more embodiments of the invention, the NAI definition for the asset type (200) is in XML language, the DAQ definition (204) may correspond to an object oriented programming language. .More specifically, a binding compiler (not shown) includes functionality to translate XML schema into one or more Java™ classes without requiring the developer to write complex parsing code. Moreover, in one or more embodiments of the invention, each DAQ definition (204) has the same names for the methods regardless of the different NAI definitions. Accordingly, the DAQ definition provides a common interface for each of the different asset types of the NAI definitions.

In accordance with one or more embodiments of the invention, the DAQ definition (204) includes cache hints (270), a DAQ event (230), and a DAQ tag (232). Each of these components is described below.

Cache hints (270) correspond to a runtime image of the cache definition (250). In one or more embodiments of the invention, the cache hints (270) correspond to an object defined by a runtime implementation of the cache definition (250).

Continuing with FIG. 3, a DAQ event (230) corresponds to a runtime binding of an event (222). Specifically, a DAQ event (230) includes functionality to compare an old value and new value for a property corresponding to the DAQ event (230). Further, the DAQ event includes functionality to register listeners for the DAQ event (230) and inform registered listeners of a current status (e.g., changes between the old and new value, no change, etc.) of the property associated with the DAQ event (230).

A DAQ tag (232) corresponds to a runtime image of the topical area definition (212). Accordingly, those skilled in the art will appreciate that a DAQ tag (232) exists for each topical area definition (212) in accordance with one or more embodiments of the invention. The DAQ tag (232) includes a DAQ property (234) and DAQ methods (236).

A DAQ property (234) corresponds to a runtime image of the properties definition (216). Similarly, DAQ methods (236) correspond to a runtime image of the active management methods (220). The DAQ methods (236) include DAQ arguments (238). The DAQ arguments (238) correspond to the arguments required by the NAI methods of the asset. For example, if the NAI method for an asset corresponding to storage is to change the partitioning of the storage, then the DAQ arguments for a DAQ method of partitioning may specify how the storage devised is partitioned.

Interposed between the DAQ definition (204) and the NAI definition for an asset type (200) is a DAQ manager (202). The DAQ manager (202) corresponds to a logical engine that includes functionality to perform a runtime binding of the NAI definition for the asset type (200) with the DAQ definition (204) in accordance with one or more embodiments of the invention. Further, the DAQ manager (202) includes functionality to identify the DAQ definition (204) for a given management request and trigger the operations required using the DAQ definition (204) for managing the asset according to the management request. In addition, the DAQ manager (202) includes functionality to use the cache hints (270) to determine whether to update the asset cache and/or obtain management information from the asset cache in response to a management request.

For example, in one exemplary implementation of one or more embodiments of the invention, the DAQ runtime includes functionality to process request of type get attributes, set attributes, invoke methods, and manage event subscription requests. The DAQ runtime processing of the requests in the exemplary implementation is described below.

In one or more embodiments of the invention, in response to a "get attribute" request the runtime includes functionality to perform the following. Specifically, in response to the "get attribute" request, the runtime includes functionality to determine the DAQ tag where the attribute of interest is located by accessing the DAQ definition associated with the asset. The DAQ definition can be located via the assets NAI specification document, which is bound at execution time into the DAQ definition object. From the DAQ tag, the DAQ runtime includes functionality to access the cache hints property in accordance with one or more embodiments of the invention. From the cache hints property, the DAQ runtime includes functionality to determine whether an attribute value, stored in the asset cache, exists and is valid in accordance with one or more embodiments of the invention. If the attribute value exists and is valid, then the DAQ runtime may respond with the attribute value.

If the attribute value does not exist and/or is not valid, the runtime includes functionality to obtain from the DAQ definition object the URI associated with the DAQ tag in accordance with one or more embodiments of the invention. Specifically, the DAQ tag includes the URI definition for the obtaining value of the attribute from the NAI of the asset in accordance with one or more embodiments of the invention. After obtaining the necessary information for identifying the NAI for the asset, the runtime includes functionality to query the protocol handler repository to obtain the protocol handler that corresponds to the URI associated with the DAQ tag in accordance with one or more embodiments of the invention. Finally, the runtime includes functionality to perform an invocation of the protocol handler to obtain the value of the required attribute and update the attribute value in the cache according to the cache hints.

Continuing with the example, in one or more embodiments of the invention, in response to a set attribute request the runtime includes functionality to perform the following. Specifically, in response to the set attribute request, the DAQ runtime includes functionality to determine the location of the DAQ tag for setting the attribute of interest. Determining the location may be performed by accessing the DAQ definition object associated with the asset in accordance with one or more embodiments of the invention. Next, the DAQ runtime includes functionality to obtain the URI associated with the DAQ tag from the DAQ definition object for the attribute in accordance with one or more embodiments of the invention. After obtaining the necessary information to set the attribute, the DAQ runtime includes functionality to query the protocol handler repository to obtain the protocol handler that corresponds to the URI associated with the DAQ tag in accordance with one or more embodiments of the invention. Finally, the DAQ runtime performs invocations of the protocol handler found in the library to set the attribute with the requested value.

Continuing with the example, in one or more embodiments of the invention, in response to an invoke method request the runtime includes functionality to perform the following. Specifically, in response to the invoke method request, the DAQ runtime includes functionality to determine the DAQ tag where the method of interest is located by accessing the DAQ definition associated with the asset. After determining the DAQ tag, the DAQ runtime includes functionality to obtain the URI associated with the method to be invoked from the DAQ definition object in accordance with one or more embodiments of the invention. Once the necessary information to invoke the method is obtained, the DAQ runtime includes functionality to query the protocol handler repository to obtain the protocol handler that corresponds to the URI associated with the DAQ tag in accordance with one or more embodiments of the invention. Finally, the DAQ runtime includes functionality to perform a method invocation operation on the protocol handler that executes the API for the method to be invoked.

Lastly in the example implementation, when the DAQ runtime receives an event subscription request, the DAQ runtime includes functionality to determine the DAQ tag for the subscription event of interest is located by accessing the DAQ definition associated with the asset. After determining the DAQ tag, the DAQ runtime includes functionality to obtain the URI associated with the DAQ tag from the DAQ definition object in accordance with one or more embodiments of the invention. Once the necessary information to invoke the method is obtained, the DAQ runtime includes functionality to query the protocol handler repository to obtain the protocol handler that corresponds to the URI associated with the DAQ tag in accordance with one or more embodiments of the invention. Finally, the DAQ runtime includes functionality to perform a subscription request operation using the protocol handler to obtain notification of events through the NAI of the asset.

As shown in the above example, the common interface through the DAQ allows for an information model to perform virtually any management functions on the asset that are exposed through the NAI of the asset without having the NAI of the asset in accordance with one or more embodiments of the invention. Specifically, using the aforementioned requests, virtually any management operation can be performed in accordance with one or more embodiments of the invention.

Figure 4:
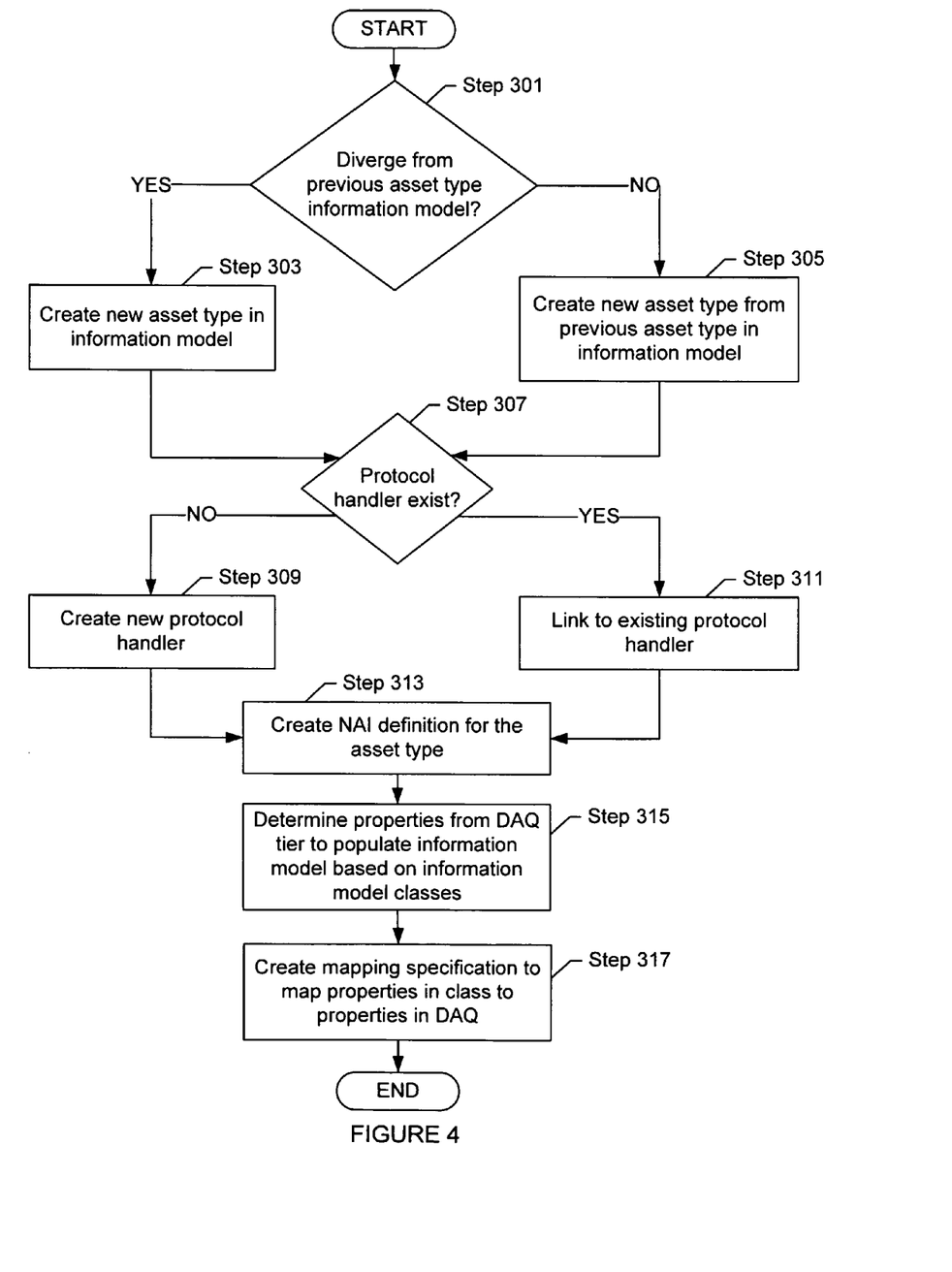
FIG. 4 shows a flowchart of a method for adding a new asset type to the system in accordance with one or more embodiments of the invention.

Also, using the DAQ runtime and the DAQ manager, new assets can be easily added to the system regardless of whether the new assets correspond to a preexisting asset type. If the new asset is of a preexisting asset type, then a new instance of the information model classes for the asset are created and information about the new asset instance is added to the DAQ. Alternatively, if the new asset is of a new asset type, then the system is configured to include the new asset type. FIG. 4 shows a flowchart of a method for adding a new asset type to the system in accordance with one or more embodiments of the invention.

Initially, a determination is made whether the new asset type diverges from a previous asset type in the information model (Step 301). A new asset type diverges from a previous asset type if the components of the new asset type (e.g., operating system, hardware, networking, etc.) are different than any existing asset type already defined in the information model in accordance with one or more embodiments of the invention. Determining whether a new asset diverges from a previously existing asset type can be performed by identifying the components of the new asset and comparing the components with the assets already in the information model.

If the new asset diverges from a previous asset type in the information model, then a new asset type is created in the information model (Step 303). Specifically, new classes are developed for managing the new asset of the new asset type.

Alternatively, if the new asset does not diverge from a previously existing asset, then a new asset type can be created from a previously existing asset type in the information model (Step 305). Specifically, any preexisting classes in the information model that can be used as a basis for the new asset type may be copied or inherited into the new classes.

After creating the new asset type, an instance of the newly developed classes is instantiated in the information model (not shown).

Continuing with FIG. 4, protocol handlers are also associated with the new asset. Specifically, a determination is made whether the protocol handlers exist for the new asset type (Step 307). Determining whether protocol handlers exist for the new asset can be performed by identifying the NAI of the asset type. Specifically, as part of the information about the asset of the new asset type or the configuration of the asset, the NAI, or interface for managing the asset type is revealed. The NAI specifies the protocols or schemes that are required for managing the asset type. Based on the specified protocols or schemes, a protocol handler can be identified.

If a protocol handler does not exist for the new asset, then a new protocol handler is created (Step 309). Specifically, at this stage, a new protocol handler is developed for the new asset. Developing the protocol handler may include creating any classes or functions for the protocol handler in a programming language in accordance with one or more embodiments of the invention.

Alternatively, if a protocol handler already exists for the asset type, then a link to the protocol handler is created (Step 311). Specifically, the NAI definition in the DAQ runtime links to the protocol handler.

Accordingly, using the newly created protocol handler or a preexisting protocol handler, the NAI definition for the asset is created (Step 313). At this stage, the mechanisms for managing the manageable components of the asset are identified. Based on the manageable components, the NAI definition is developed. Specifically, for each mechanism for managing the asset, a definition is added to the NAI definition for the asset. More specifically, the tags are identified and the information within the tags is populated in accordance with one or more embodiments of the invention. Further, while creating the NAI definition, the cache definition is also created in accordance with one or more embodiments of the invention. Specifically, a developer may specify the parameters for the cache definition. In one or more embodiments of the invention, the cache definition is configurable during runtime. Thus, a user or administrator may change the cache definition during execution.

At any stage after creating the NAI definition and before the asset is managed, the DAQ manager may perform the runtime binding of the NAI definition to the DAQ definition. Performing the runtime binding may include, for example, parsing the NAI definition and creating a DAQ definition object that includes the cache hints for managing the asset using the information in the NAI definition.

In order to manage the asset of the new asset type, the information model instance must be link to the NAI definition. Accordingly, the properties from the DAQ tier to populate the information model are determined based on the information model classes (Step 315). Specifically, the procedures for populating the information model based on the NAI definition are identified.

Using the identified procedures, a mapping specification is created to map the properties in the information model class to the properties in the DAQ (Step 317). Creating the mapping specification may include identifying how the components of the information model correlate to the components of the DAQ. The mapping specification may then be created to reflect the correlation between components.

Once the mapping specification is created, instances of the information model are added, and NAI definition is bound to the DAQ definition, the asset can be managed according to management requests.

Figure 5:
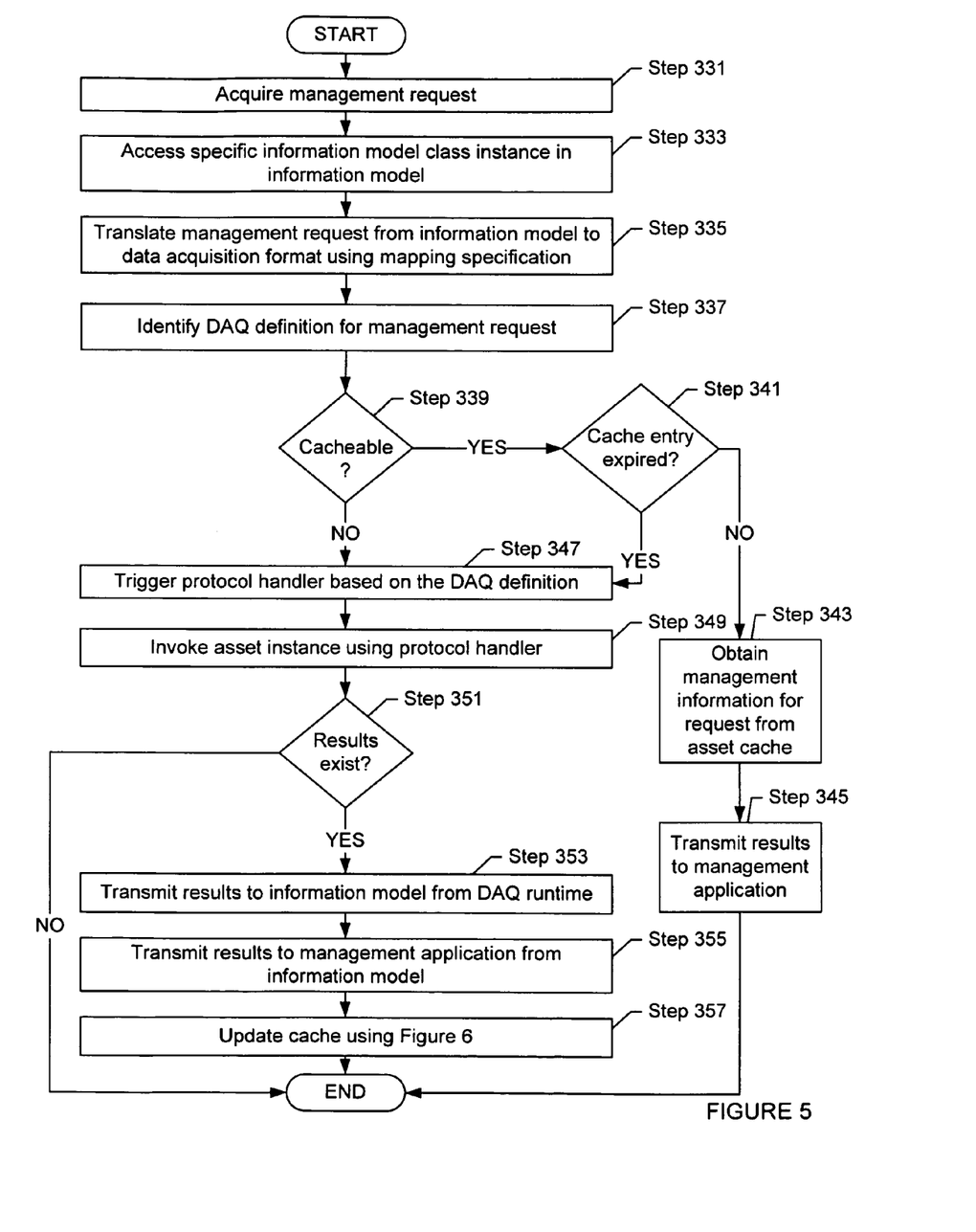
FIG. 5 shows a flowchart of a method for processing a management request in accordance with one or more embodiments of the invention.

FIG. 5 shows a flowchart of a method for processing a management request in accordance with one or more embodiments of the invention. Initially, a management request is acquired (Step 331). In one or more embodiments of the invention, the management request is received by the information model in information model format. More specifically, the management application submits a query to the information model using the API of the information model.

According to the management request, the information model class instance is accessed in the information model (Step 333). In particular, the management request may include one or more asset identifiers or an asset type identifier. Based on the identifiers and the type of request, information model asset type instance is identified and accessed. At this stage, the information model class instance may be triggered to perform the management function specified in the management request.

If the management request is for management information and the information model class has a cache that includes the request management information, then the management information may be sent to the management application and the method may end.

Alternatively, in one or more embodiments of the invention, by accessing the information model class instance, an API is called from the information model class instance. Specifically, the information model class instance includes a call to an API for managing the asset. The API may or may not have any resemblance to the NAI of the asset. In one or more embodiments of the invention, the call to the API is intercepted.

Continuing with FIG. 5, the request is translated from the information model format to the data acquisition format using the mapping specification (Step 335). Specifically, the parameters from the request are formatted according to the requirements of the DAQ definition, and the any remaining necessary formatting changes known in the art may be performed. For example, the information model formatted request may be formatted in an information model language. Accordingly, the language of the request may be translated to a format that a DAQ language can understand.

Also, the DAQ definition is identified via the NAI definition that is bound to the DAQ definition from the API for the management request (Step 337). Identifying the native asset interface definition may be performed using virtually any technique known in the art. For example, a mapping specification may be queried for the DAQ definition corresponding to the management request. Alternatively, the DAQ manager may determine the type of management request and the asset type of the management request to identify the DAQ definition for the management request.

Next, the DAQ definition is accessed to obtain the cache hints in accordance with one or more embodiments of the invention. A determination is made whether the management request is for management information and whether the requested management information is cacheable (Step 339). Determining whether the management information is cacheable may be performed by accessing the cacheable policy in the cache hints object.

If the management request is cacheable, then a determination is made whether the cache entry that contains the management information has expired (Step 341). Similar to the cacheable determination, the cache hints may also be used to obtain the cache expiration policy. Based on the cache expiration policy, a calculation can be performed to determine whether the cache entry has expired.

If the management request is for management information that is an unexpired entry in the cache, then the management information for the request is obtained from the cache (Step 343). Specifically, the cache entry may be queried and the value in the cache entry acquired. Further, at this stage, if the cache entry is double buffered, then old values may also be acquired.

Thus, without requiring access to the asset, results containing the management information may be transmitted to the management application (Step 345).

Alternatively, if the cache entry has expired, or if the cache entry is not cacheable, then the protocol handler is triggered based on the DAQ definition (Step 347). Specifically, as previously stated, the DAQ definition identifies the protocol handlers and the mechanism for managing the asset using the protocol handlers. Based on the DAQ definition, the protocol handler is triggered with the information about the mechanism for the management. For example, suppose the DAQ definition corresponds to the runtime binding of the following NAI definition snmp://aggie@bevo:port/1.3.6.2.1.1.1.*. In such scenario, the protocol handler associated with the SNMP protocol is invoked with the information to obtain the management information from the location identified by: aggie@bevo:port/1.3.6.2.1.1.1.* in accordance with one or more embodiments of the invention.

Accordingly an asset instance is invoked using the protocol handler (Step 349). Specifically, the protocol handler uses the NAI that is identified by the NAI definition to invoke the management of the asset instance by the asset. By invoking the asset instance, results that include management information may be outputted.

Thus, a determination is made whether results that include management information exist (Step 351). If results that include management information exist, then the results are transmitted to the information model from the DAQ (Step 353). Specifically, in one or more embodiments of the invention, the information model class that called the API receives the results. Further, the results may be translated for the DAQ format to the information model format using the mapping specification.

At this stage, the result may also be transmitted to the management application from the information model (Step 355). Transmitting the results from the information model format may be performed by a return statement of the information model.

Figure 6:
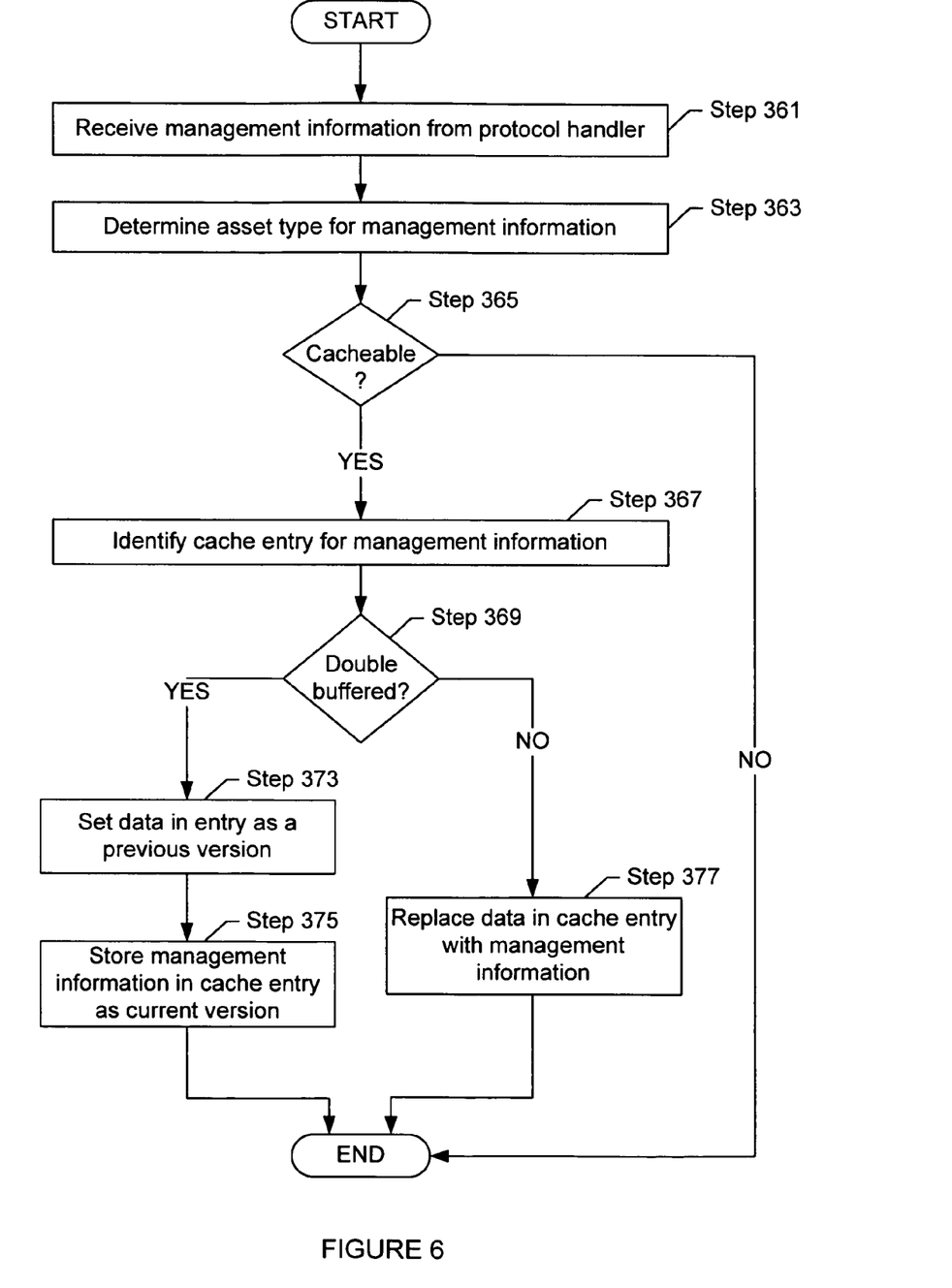
FIG. 6 shows a flowchart of a method for adding management information to a cache in accordance with one or more embodiments of the invention.

Also, the asset cache for the management information may be updated according to FIG. 6 (Step 357).

As shown in FIG. 5, by using the DAQ definition and performing the translation, the information models, protocol handlers, and assets can be easily modified without unduly affecting the system. Specifically, the information model does not have to be aware of each NAI of each asset. Accordingly, an asset can be managed by a variety of management requests without having to modify the management application or the information model.

FIG. 6 shows a flowchart of a method for adding management information to a cache in accordance with one or more embodiments of the invention. Initially, management information is received from a protocol handler (Step 361).

Next, the asset type for the management information is determined in accordance with or more embodiments of the invention (Step 363). Determining the asset type can be performed from the protocol handler that is triggered in the management request. Specifically, in the process of triggering the protocol handler, a link may be created between the DAQ definition and the protocol handler.

At this stage, the DAQ definition may be accessed. A determination is made whether the cache entry associated with the management information is cacheable (Step 365). If the management information is cacheable, then the cache entry for the management information is identified (Step 367). The cache entry may be identified using virtually any technique known in the art.

Also, a determination is made whether the cache entry is double buffered in accordance with one or more embodiments of the invention (Step 369). Determining whether the cache entry is double buffered may be performed by obtaining the double buffering policy in the cache hints.

If the cache entry is not double buffered, then any previous data in the cache entry is replaced with the management information (Step 377). Those skilled in the art will appreciate that replacing the previous data may correspond to overwriting the previous data, setting an indicator corresponding to the previous data as invalid to be reclaimed by the asset cache later, or performing any other technique known in the art.

Alternatively, if the cache entry is double buffered, then previous data in the cache entry is set as a previous version (Step 373). Also, the management information that is recently obtained is set as a current version in the cache entry (Step 375). Thus, a management application can obtain a historical perspective on the management information.

In the following example, consider the case in which the asset is a computer system in which the temperature of the processor must be monitored and regulated to prevent failure. In the example, the property for temperature is cacheable, the write-through policy is set so that management requests for the temperature go directly to the asset, the double buffering policy is set for double buffering, and the polling frequency is set to every half hour.

Accordingly, over a period of twenty-four hours, the entry for temperature for the asset cache contains forty-eight temperatures. Further consider the scenario in which at the end of the twenty-four hours, the computer system fails. An administrator submits a management request for the temperature including historical information through a management application to an information model.

Without having information about the protocol required by the computer system, the information model forwards the management request. The management request is translated to DAQ format and the asset type of the computer system is determined. Because write-through policy is set, the protocol handler is triggered. After obtaining the information from the computer system, the protocol handler returns the temperature to the DAQ.

Further, because the management information is cacheable and double-buffered, historical data in the form of the forty-eight previous temperatures are obtained. Also, the newly acquired temperature from the protocol handler is stored in the asset cache. The entire data set, including the current temperature of the computer system is transmitted back via the information model and management application to the administrator.

Accordingly, the administrator is able to tell that the temperature of the computer system has been steadily rising over the past twenty-four hours.

Figure 7:
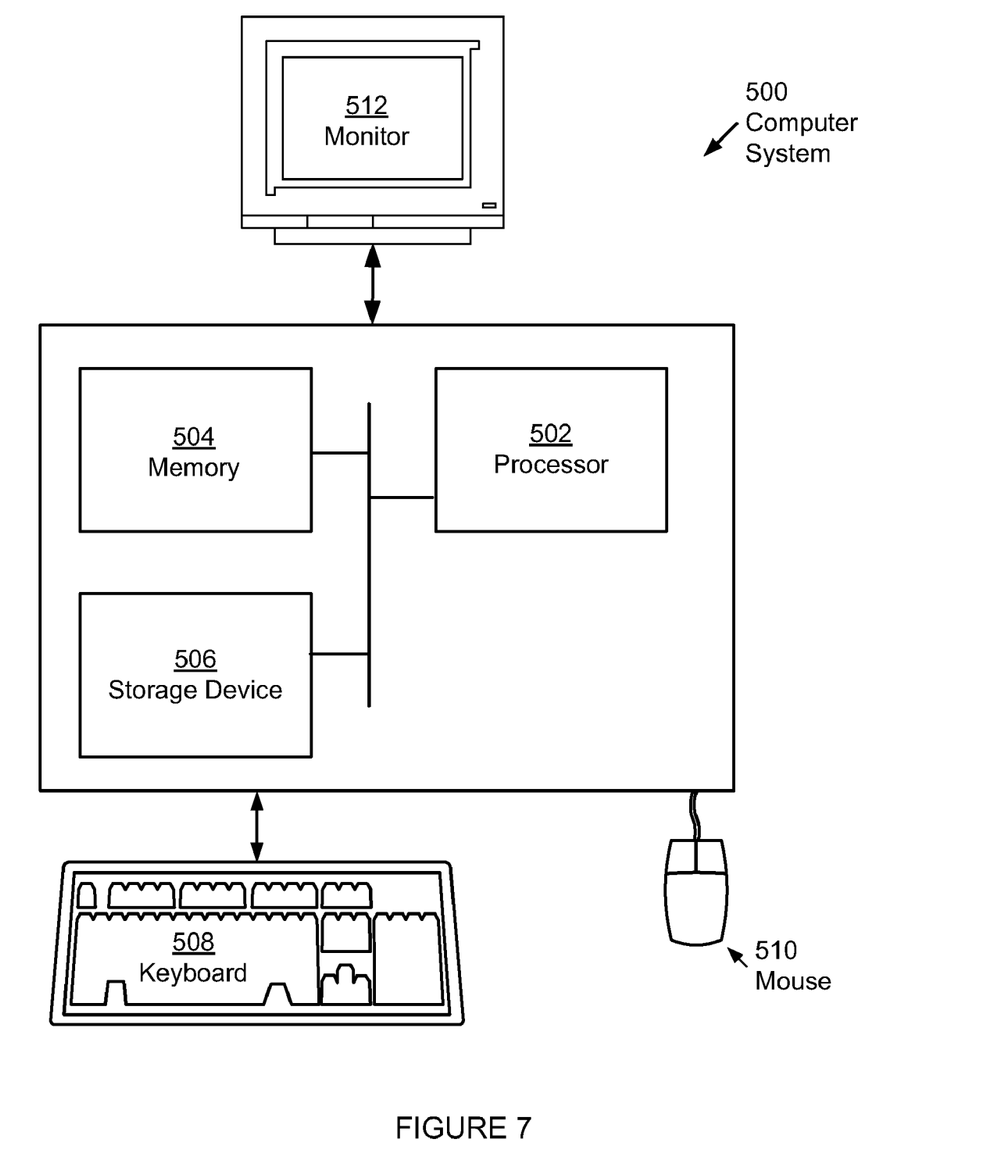
FIG. 7 shows a computer system in accordance with one or more embodiments of the invention.

The invention may be implemented on virtually any type of computer regardless of the platform being used. For example, as shown in FIG. 7, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., NAI definition, DAQ definition, Information model repository, protocol handler repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a mechanism for easy management of assets. Specifically, embodiments of the invention minimize the amount of framework code required for managing an asset. For example, by only adding metadata definitions to the DAQ runtime in the form of NAI definitions, new assets of new asset types can be easily added to the system. Specifically, when new assets are added to the system, the information model may only be adjusted to add class information for managing the new asset. The specific protocol information for the new asset and NAI specific methods for managing the asset do not need to be added to the information model. Accordingly, embodiments of the invention reduce the barrier of entry for new products to be instrumented and integrated into systems and network management framework.

Further, by separating the information model and the mechanism for obtaining management information about an asset, multiple information model class instances can obtain management information from the DAQ runtime without constant interruption to the asset. Specifically, by using the asset cache, information model instances can repetitively obtain the same management information without interrupting processing on the asset. Accordingly, without the interruption, the performance of the asset may increase.

Further, embodiments of the invention provide a mechanism whereby the NAI for the asset can be updated as new technologies are developed without unduly affecting the management infrastructure. Specifically, if a protocol handler exists for the updated NAI, then only the definition needs to change for the asset.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for gathering management information about an asset comprising:
receiving a first request for the management information about the asset, wherein the first request complies with an information model format;
translating the first request from the information model format to a data acquisition (DAQ) format to create a translated request;
identifying a DAQ definition based on the translated request, wherein the DAQ definition is in the DAQ format, wherein the DAQ definition is particular to a type of asset, wherein the DAQ definition comprises a DAQ method and a cache hint, wherein the DAQ definition is a runtime binding of a native asset interface (NAI) definition, wherein the NAI definition is defined for the type of asset, wherein the cache hint is a runtime image of a cache definition in the NAI definition, and wherein the cache definition defines how to cache management information for the type of asset;
triggering a protocol handler according to the DAQ method to obtain the management information about the asset;
receiving a result comprising the management information from the protocol handler based on triggering the protocol handler; and
updating, using a processor, a cache entry with the result based on the cache hint,
wherein the asset is at least one selected from a group consisting of a hardware component and software executing on a computer.

2. The method of claim 1, further comprising:
receiving a second request for the management information from a management application;
obtaining the management information from the cache; and
transmitting the management information to the management application.

3. The method of claim 1, further comprising:
receiving a second request for the management information from a management application;
determining, from the cache hint, whether the cache entry expired based on a cache expiration policy in the cache definition, whether the cache expiration policy specifies a duration of time between when the management information is stored in the cache entry and when the cache entry expires;
when the cache entry is expired:
triggering the protocol handler according to the DAQ method to obtain updated management information about the asset;
receiving the updated management information from the protocol handler; and
transmitting the updated management information to the management application; and
when the cache entry is not expired:
obtaining the management information from the cache; and
transmitting the management information to the management application.

4. The method of claim 1, further comprising:
identifying, from the cache hint, a fallback frequency of the cache entry based on a fallback frequency policy defined in the cache definition, wherein the fallback frequency policy defines when to request updated management information from the asset;
determining, from the cache hint, whether the fallback frequency is reached,
when the fallback frequency is reached:
triggering the protocol handler according to the DAQ method to obtain the updated management information about the asset;
receiving the updated management information from the protocol handler; and
storing the updated management information in the cache entry.

5. The method of claim 1, wherein updating the cache comprises:
determining, from the cache hint, whether the cache entry is double-buffered based on a double buffer policy defined in the cache definition, wherein the double buffer policy defines whether to keep historical management information in the cache entry, wherein the cache entry comprises data before the management information is saved.

6. The method of claim 5, wherein, when the cache entry is double buffered, updating the cache comprises:
setting the data in the cache entry as a previous version; and
saving the management information as a current version in the cache entry.

7. The method of claim 5, wherein, when the cache entry is not double buffered updating the cache comprises:
overwriting the data in the cache entry.

8. The method of claim 1, wherein triggering the protocol handler according to the DAQ definition comprises:

identifying the protocol handler to obtain a property from the asset; and triggering the protocol handler to obtain the property from the asset.

9. The method of claim 1, wherein the NAI definition is defined in extensible markup language.

10. The method of claim 1, further comprising:

generating the DAQ definition from the NAI definition, wherein the NAI definition comprises at least one selected from a group consisting of a cache expiration policy, a fallback frequency policy, a double buffer policy, a persistent storage policy, a poll frequency policy, and a write through policy, wherein the cache expiration policy specifies a duration of time between when the management information is stored in the cache entry and when the cache entry expires, wherein the fallback frequency policy defines when to request updated management information from the asset, wherein the double buffer policy defines whether to keep historical management information in the cache entry when new management information is received, wherein the persistent storage policy defines whether to keep the management information in the cache in persistent storage, wherein the poll frequency policy defines how often to obtain the management information from the asset, and wherein the write through policy defines whether to obtain updated management information from the asset when any request is received from the management application.

11. The method of claim 1, wherein the asset is one of a plurality of assets having a plurality of heterogeneous asset types, and wherein each asset type of the plurality of heterogeneous asset types has a corresponding NAI definition and DAQ definition.

12. A system for gathering management information about an asset comprising:

a processor;

a data acquisition (DAQ) manager executing on the processor and configured to:

receive a translated request for the management information about the asset, wherein the translated request complies with a DAQ format;

identify a DAQ definition based on the translated request, wherein the DAQ definition is in the DAQ format, wherein the DAQ definition is particular to a type of asset, wherein the DAQ definition comprises a DAQ method and a cache hint, wherein the DAQ definition is a runtime binding of a native asset interface (NAI) definition, wherein the NAI definition is defined for the type of asset, wherein the cache hint is a runtime image of a cache definition in the NAI definition, and wherein the cache definition defines how to cache management information for the type of asset;

trigger a protocol handler according to the DAQ method to obtain the management information about the asset;

receive a result comprising the management information from the protocol handler based on triggering the protocol handler; and update a cache entry with the result based on the cache hint; and an information model runtime configured to:

translate a first request from an information model format to the DAQ format, wherein the asset is at least one selected from a group consisting of a hardware component and software executing on a computer.

13. The system of claim 12, wherein the information model runtime is further configured to:

receive a second request for the management information from a management application;

obtain the management information from the cache; and transmit the management information to the management application.

14. The system of claim 12, wherein the DAQ manager is further configured to:

receive a second request for the management information from a management application via the information model runtime;

determine, from the cache hint whether the cache entry expired based on a cache expiration policy defined in the cache definition, wherein the cache expiration policy specifies a duration of time between when the management information is stored in the cache entry and when the cache entry expires;

when the cache entry is expired:

trigger the protocol handler according to the DAQ method to obtain updated management information about the asset;

receive the updated management information from the protocol handler; and transmit the updated management information to the management application; and when the cache entry is not expired:

obtain the management information from the cache; and transmit the management information to the management application.

15. The system of claim 12, wherein the DAQ manager is further configured to:

identify, from the cache hint, a fallback frequency of the cache entry based on a fallback frequency policy defined in the cache definition, wherein the fallback frequency policy defines when to request updated management information from the asset;

determine, from the cache hint, whether the fallback frequency is reached, when the fallback frequency is reached:

trigger the protocol handler according to the DAQ method to obtain the updated management information about the asset;

receive the updated management information from the protocol handler; and store the updated management information in the cache entry.

16. The system of claim 12, wherein updating the cache comprises:

determining, from the cache hint, whether the cache entry is double-buffered based on a double buffer policy defined in the cache definition, wherein the double buffer policy defines whether to keep historical management information in the cache entry, wherein the cache entry comprises data before the management information is saved.

17. The system of claim 16, wherein, when the cache entry is double buffered, updating the cache comprises:

setting the data in the cache entry as a previous version; and saving the management information as a current version in the cache entry.

18. The system of claim 17, wherein, when the cache entry is not double buffered updating the cache comprises:
overwriting the data in the cache entry.

19. A distributed computer system having a plurality of nodes, wherein each of the plurality of nodes comprises a processor and wherein the distributed computer system, using the processor on at least one of the plurality of nodes, is configured to perform a method, the method comprising:
receiving a first request for management information about an asset, wherein the first request complies with an information model format;
translating the first request from the information model format to a data acquisition (DAQ) format to create a translated request;
identifying a DAQ definition based on the translated request, wherein the DAQ definition is in the DAQ format, wherein the DAQ definition is particular to a type of asset, wherein the DAQ definition comprises a DAQ method and a cache hint, wherein the DAQ definition is a runtime binding of a native asset interface (NAI) definition, wherein the NAI definition is defined for the type of asset, wherein the cache hint is a runtime image of a cache definition in the NAI definition, and wherein the cache definition defines how to cache management information for the type of asset;
triggering a protocol handler according to the DAQ method to obtain the management information about the asset;
receiving a result comprising the management information from the protocol handler based on triggering the protocol handler; and
updating a cache entry with the management information result based on the cache hint,
wherein the asset is at least one selected from a group consisting of hardware and software executing on the hardware,
wherein triggering the protocol handler is performed on at least one of the plurality of nodes.

20. The distributed computer system of claim 19, wherein the method further comprises:
receiving a second request for the management information about the asset from a management application;
obtaining the management information from the cache; and
transmitting the management information to the management application.

* * * * *

UNITED STATES PATENT AND TRADEMARK OFFICE
CERTIFICATE OF CORRECTION

PATENT NO. : 7,676,475 B2  Page 1 of 1
APPLICATION NO. : 11/472660
DATED : March 9, 2010
INVENTOR(S) : Arieh Markel et al.

It is certified that error appears in the above-identified patent and that said Letters Patent is hereby corrected as shown below:

In Claim 19, Column 22 (line 8), please delete the words "management information".

Signed and Sealed this

Twenty-second Day of June, 2010

David J. Kappos
*Director of the United States Patent and Trademark Office*